US008356821B2

(12) United States Patent
Freal et al.

(10) Patent No.: US 8,356,821 B2

(45) Date of Patent: Jan. 22, 2013

(54) SHAFT SEAL ASSEMBLY FOR HYDROGEN COOLED TURBINE GENERATOR

(75) Inventors: David M. Freal, Orlando, FL (US); Joseph M. Emery, Orlando, FL (US); John M. Nemeth, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 993 days.

(21) Appl. No.: 12/125,984

(22) Filed: May 23, 2008

(65) Prior Publication Data

US 2009/0289420 A1 Nov. 26, 2009

(51) Int. Cl.
*F16J 15/16* (2006.01)

(52) U.S. Cl. ........................................ 277/581; 277/578

(58) Field of Classification Search .................. 277/500, 277/578, 579, 580, 581
See application file for complete search history.

(56) References Cited

U.S. PATENT DOCUMENTS

| | | | | |
|---|---|---|---|---|
| 4,082,296 | A | 4/1978 | Stein | |
| 5,558,341 | A | 9/1996 | McNickle et al. | |
| 6,082,740 | A | 7/2000 | Jones et al. | |
| 6,145,843 | A | 11/2000 | Hwang | |
| 6,378,873 | B1 * | 4/2002 | Mayer et al. | 277/355 |
| 6,431,550 | B1 * | 8/2002 | Tong | 277/346 |
| 6,464,230 | B1 | 10/2002 | Tong et al. | |
| 6,685,190 | B1 * | 2/2004 | Mayer et al. | 277/355 |
| 6,692,006 | B2 | 2/2004 | Holder | |
| 6,707,179 | B2 | 3/2004 | Guttromson et al. | |
| 7,432,620 | B2 * | 10/2008 | Freal et al. | 310/90 |
| 7,538,464 | B2 * | 5/2009 | Hemmi et al. | 310/90 |
| 2006/0267288 | A1 | 11/2006 | Freal et al. | |

* cited by examiner

*Primary Examiner* — Gilbert Lee

(57) ABSTRACT

A seal assembly forming a seal with a rotatable shaft of a hydrogen-cooled generator is provided. The seal assembly includes a ring assembly disposed about the rotatable shaft. The ring assembly includes a fluid inlet and a fluid outlet. A hydrogen side ring is coupled to a generator frame of the generator. An insulating structure is positioned between the hydrogen side ring and the generator frame to provide electrical insulation between the hydrogen side ring and the generator frame. An air side ring is disposed adjacent to the hydrogen side ring and the seal structure is coupled to the air side ring. Structure for supplying oil to the ring assembly is provided, such that the oil flows through the ring assembly to an interface between the rotatable shaft and the seal structure so as to substantially limit direct contact between the rotatable shaft and the seal structure.

13 Claims, 4 Drawing Sheets

SHAFT SEAL ASSEMBLY FOR HYDROGEN COOLED TURBINE GENERATOR

FIELD OF THE INVENTION

The present invention generally relates to a shaft seal assembly for use in a hydrogen-cooled turbine generator, and more particularly, to a shaft seal assembly disposed between a hydrogen side of the generator and an air side of the generator to prevent hydrogen from leaking into the air side and to prevent air from leaking into the hydrogen side.

BACKGROUND OF THE INVENTION

Commonly owned U.S. patent application Ser. No. 11/136,639, the entire disclosure of which is hereby incorporated by reference in its entirety, discloses shaft seal assemblies circumferentially extending about opposing ends of a rotor forming part of a hydrogen-cooled generator. Each shaft seal assembly comprises a sealing cartridge disposed in a bracket member. A sealing fluid is provided at an interface between the rotor shaft and each seal assembly to prevent the passage of gas through a gap at the interface.

SUMMARY OF THE INVENTION

In accordance with one aspect of the present invention, a seal assembly forming a seal with a rotatable shaft of a hydrogen-cooled generator is provided. The seal assembly comprises a ring assembly disposed about the rotatable shaft. The ring assembly includes a fluid inlet and a fluid outlet and comprises a hydrogen side ring, an insulating structure, an air side ring, and a seal structure. The hydrogen side ring is coupled to a generator frame of the generator. The insulating structure is positioned between the hydrogen side ring and the generator frame to provide electrical insulation between the hydrogen side ring and the generator frame. The air side ring is disposed adjacent to the hydrogen side ring and the seal structure is coupled to the air side ring. Structure for supplying oil to the ring assembly is provided, such that the oil flows through the ring assembly to an interface between the rotatable shaft and the seal structure so as to substantially limit direct contact between the rotatable shaft and the seal structure.

The air side ring may be mechanically coupled to the hydrogen side ring.

The fluid inlet may be formed in the air side ring and in communication with a seal oil pump that conveys substantially clean oil to the fluid inlet.

The generator frame may comprise an end shield, and at least one insulated fastening structure may be used to mount the hydrogen side ring to the end shield.

The hydrogen side ring and the air side ring may be formed from segments of carbon steel.

The seal structure may comprise carbon seal segments that are arranged on the air side ring to extend about the rotatable shaft.

The insulating structure may comprise a gasket formed from paper, rubber, or silicon.

In accordance with another aspect of the present invention, a seal assembly forming a seal with a rotatable shaft of a hydrogen-cooled generator is provided. The seal assembly comprises a ring assembly disposed about the rotatable shaft. The ring assembly includes a fluid inlet and a fluid outlet and comprises a first side ring, an insulating structure, a second side ring, and seal structure. The first side ring is coupled to a generator frame of the generator. The insulating structure is positioned between the first side ring and the generator frame to provide electrical insulation between the first side ring and the generator frame. The second side ring is coupled to the first side ring and the second side ring is not in direct contact with the generator frame. The seal structure is coupled to the first or the second side ring. Structure for supplying oil to the ring assembly is provided, such that the oil flows through the ring assembly to an interface between the rotatable shaft and the seal structure so as to substantially limit direct contact between the rotatable shaft and the seal structure.

In accordance with yet another aspect of the present invention, a method of servicing a seal assembly forming a seal with a rotatable shaft of a hydrogen-cooled generator is provided. The seal assembly comprises a ring assembly including a hydrogen side ring coupled to a generator frame of the generator, an insulating structure positioned between the hydrogen side ring and the generator frame, an air side ring coupled to the hydrogen side ring, and seal structure coupled to the air side ring. The method comprises removing the air side ring from the hydrogen side ring, servicing the air side ring, and coupling the serviced air side ring to the hydrogen side ring. The insulating structure between the hydrogen side ring and the generator frame remains intact during removal of the air side ring from the hydrogen side ring and coupling of the serviced air side to the hydrogen side ring.

Servicing the air side ring may comprise inspecting the air side ring, repairing the air side ring, and/or replacing the air side ring.

Servicing the air side ring may comprise servicing the seal structure.

Servicing the seal structure may comprise inspecting the seal structure, repairing the seal structure, and/or replacing the seal structure.

The seal structure may comprise carbon seal segments that are arranged on the air side ring to extend about the rotatable shaft.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
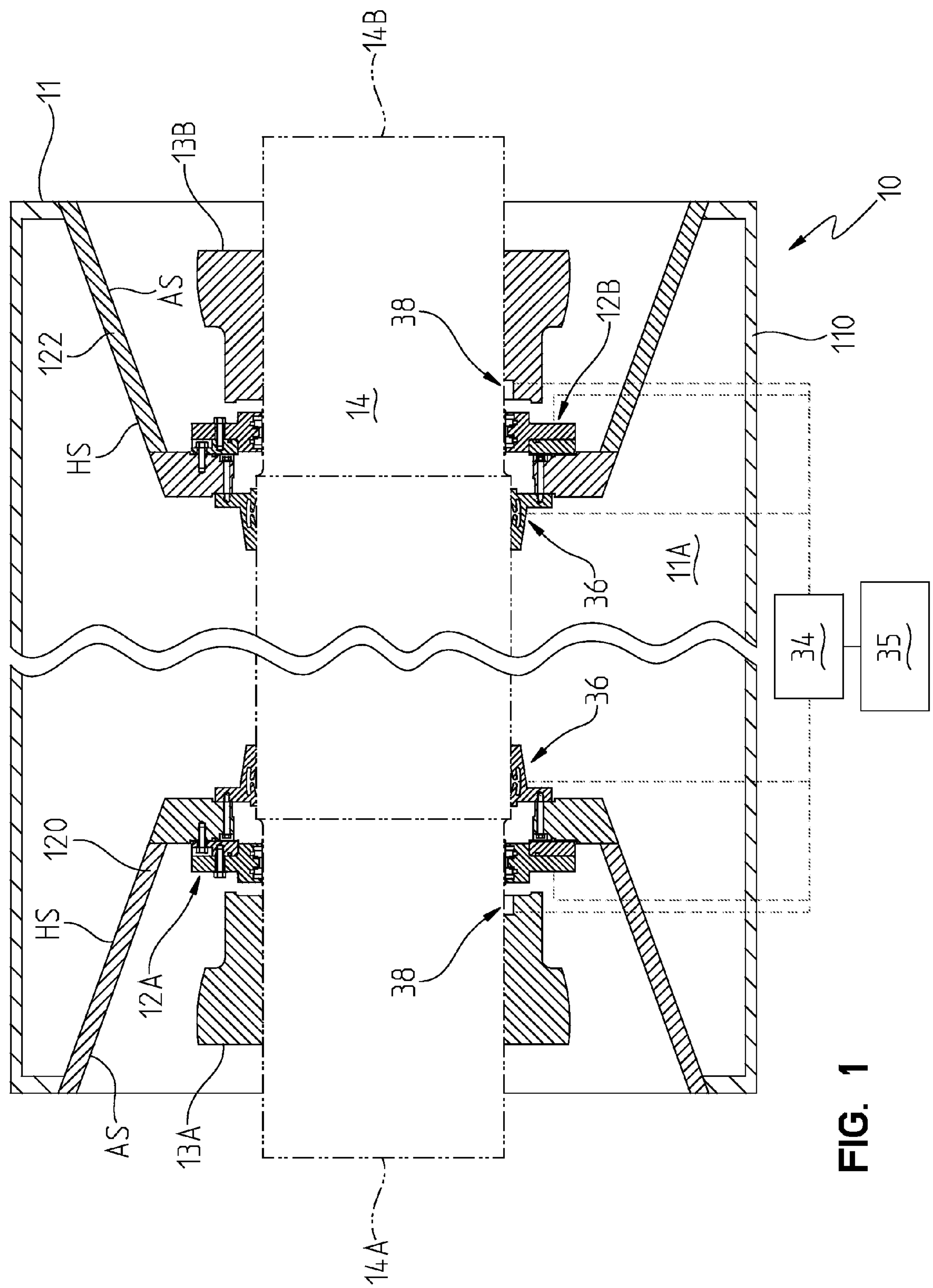
FIG. 1 is a side cross sectional view of portion of a hydrogen-cooled turbine generator according to an embodiment of the invention.

FIG. 1 illustrates a portion of a hydrogen-cooled turbine generator 10 having a generator frame 11 defining an internal chamber 11A adapted to receive hydrogen gas. The generator frame 11 houses a power generator comprising a stator (not shown) and a rotor (only a rotatable shaft 14 of the rotor is illustrated in FIG. 1). The frame 11 comprises a main body 110 and first and second end shields 120, 122 coupled to the main body 110. The end shields 120, 122 comprise inner hydrogen sides HS and outer air sides AS. The generator 10 further includes first and second shaft seal assemblies 12A, 12B, respectively, disposed adjacent to respective bearings 13A, 13B about opposing ends 14A, 14B of the rotatable shaft 14 of the generator rotor. The first and second shaft seal assemblies 12A, 12B are coupled to the first and second end shields 120, 122 and sealingly engage the rotatable shaft 14. The first and second shaft seal assemblies 12A, 12B provide a substantially fluid tight seal with the rotatable shaft 14 to prevent air from entering the generator frame internal chamber 11A and to prevent hydrogen gas from leaving the generator frame internal chamber 11A.

Figure 2:
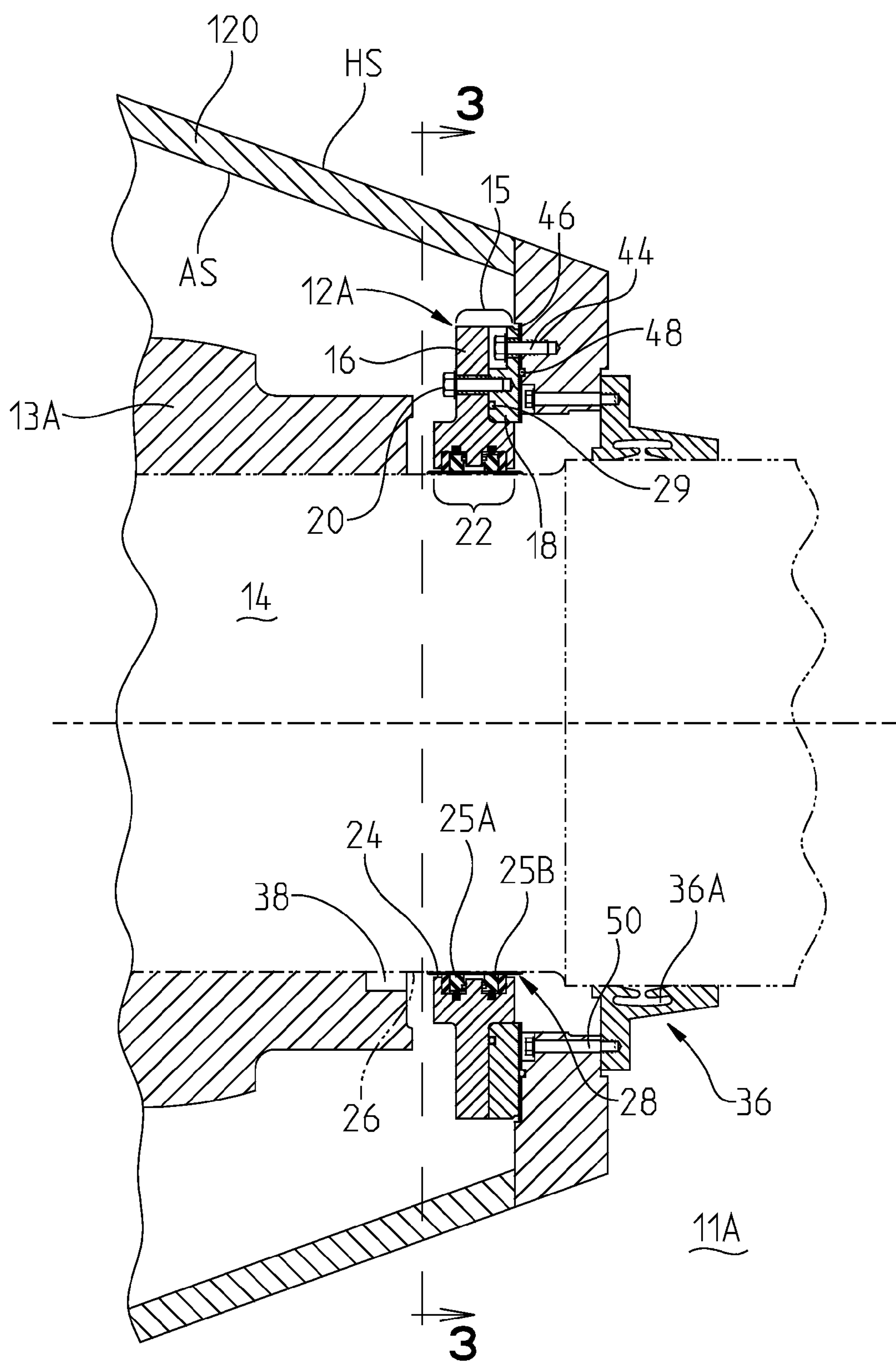
FIG. 2 is an enlarged side cross sectional view of a portion of the hydrogen-cooled turbine generator illustrated in FIG. 1 showing a shaft seal assembly according to an embodiment of the invention.

The first shaft seal assembly 12A will now be described. It is noted that the second shaft seal assembly 12B is substantially a mirror image of the first shaft seal assembly 12A and performs the same function as the first shaft seal assembly 12A. As shown in FIG. 2, the first shaft seal assembly 12A comprises a ring assembly 15 including an air side ring 16 coupled to a hydrogen side ring 18. In the embodiment shown, the air side ring 16 and the hydrogen side ring 18 are formed from circumferential segments of carbon steel, although any suitable material may be used to form the air side ring 16 and the hydrogen side ring 18. Further, the air side ring 16 and the hydrogen side ring 18 may each be formed from any number of circumferential segments as desired. A plurality of first fasteners 20, such as, for example, stainless steel bolts, is used to couple the air side ring 16 to the hydrogen side ring 18.

The ring assembly 15 further includes an associated seal structure 22 that is coupled to a radially inner side 24 of the air side ring 16. In the embodiment shown in FIGS. 2 and 2A, the seal structure 22 comprises first and second ring seals 25A, 25B, but may comprise any suitable number of ring seals. The ring seals 25A, 25B may be formed from any suitable material, but are preferably formed from segments of carbon that extend about the rotatable shaft 14, such as the segments disclosed in U.S. Pat. No. 6,145,843 or U.S. Pat. No. 6,692,006, the entire disclosures of which are incorporated by reference herein. The seal structure 22 cooperates with an outer surface 26 of the rotatable shaft 14 and a thin layer of oil 28 that flows between the ring seals 25A, 25B and the rotatable shaft 14 during operation of the generator 10 to form the seal between the first shaft seal assembly 12A and the rotatable shaft 14. The seal structure 22 may be disposed in an associated housing (not shown) and then coupled to the air side ring 16 or the seal structure 22 may be coupled directly to the air side ring 16, as shown in FIG. 2. A second seal structure 29, such as an O-ring, for example, may be disposed between the air side ring 16 and the hydrogen side ring 18, as shown in FIG. 2.

Figure 2A:
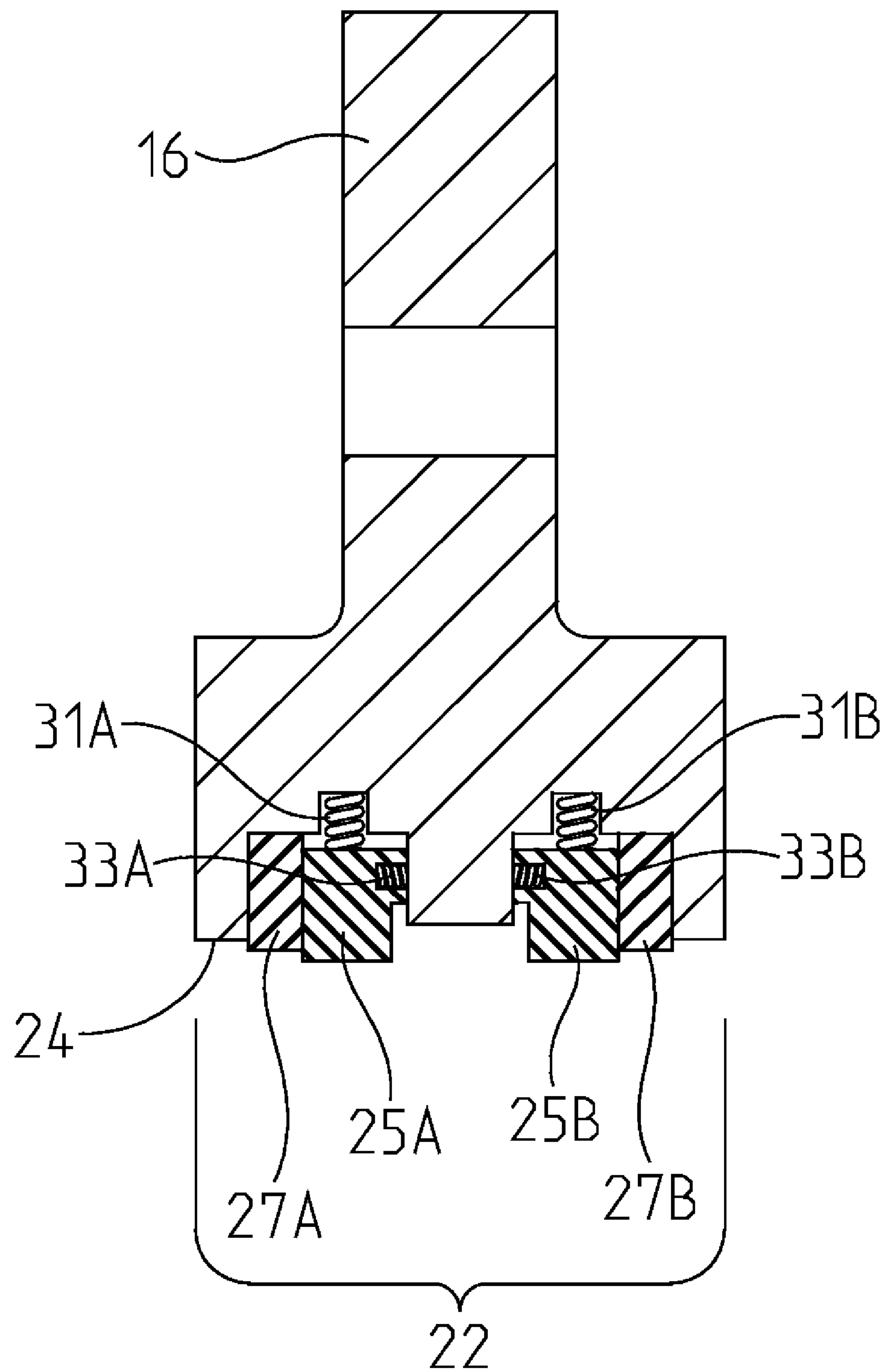
FIG. 2A is an enlarged side cross sectional view of a portion of the shaft seal assembly illustrated in FIG. 2.

Optionally, a first circumferential bumper ring 27A may be disposed adjacent to the first ring seal 25A and a second circumferential bumper ring 27B may be disposed adjacent to the second ring seal 25B as shown in FIG. 2A. The bumper rings 27A, 27B may be attached to the air side ring 16 by any means, such as, for example, by gluing. The bumper rings 27A, 27B may assist in securing the ring seals 25A, 25B in place. Alternatively, the rings seals 25A, 25B may directly abut the inner surface of the air side ring 16. Additionally, a plurality of first and second radial coil springs 31A, 31B may bias the respective ring seal 25A, 25B toward the rotatable shaft 14, and a plurality of first and second axial coil springs 33A, 33B may bias the respective ring seal 25A, 25B toward the respective bumper ring 27A, 27B to further assist in securing the ring seal 25A, 25B in place, as shown in FIG. 2A. In a preferred embodiment, three first radial coil springs 31A, three second radial coil springs 31B, three first axial coil springs 33A, and three second axial coil springs 33B are disposed in circumferential locations in respective slots formed in the air side ring 16 to bias the respective rings seal 25A, 25B, although any suitable number of springs 31A, 31B, 33A, 33B may be used. It is understood that other types of biasing members than coil springs may provide the respective biases to the ring seals 25A, 25B.

Figure 3:
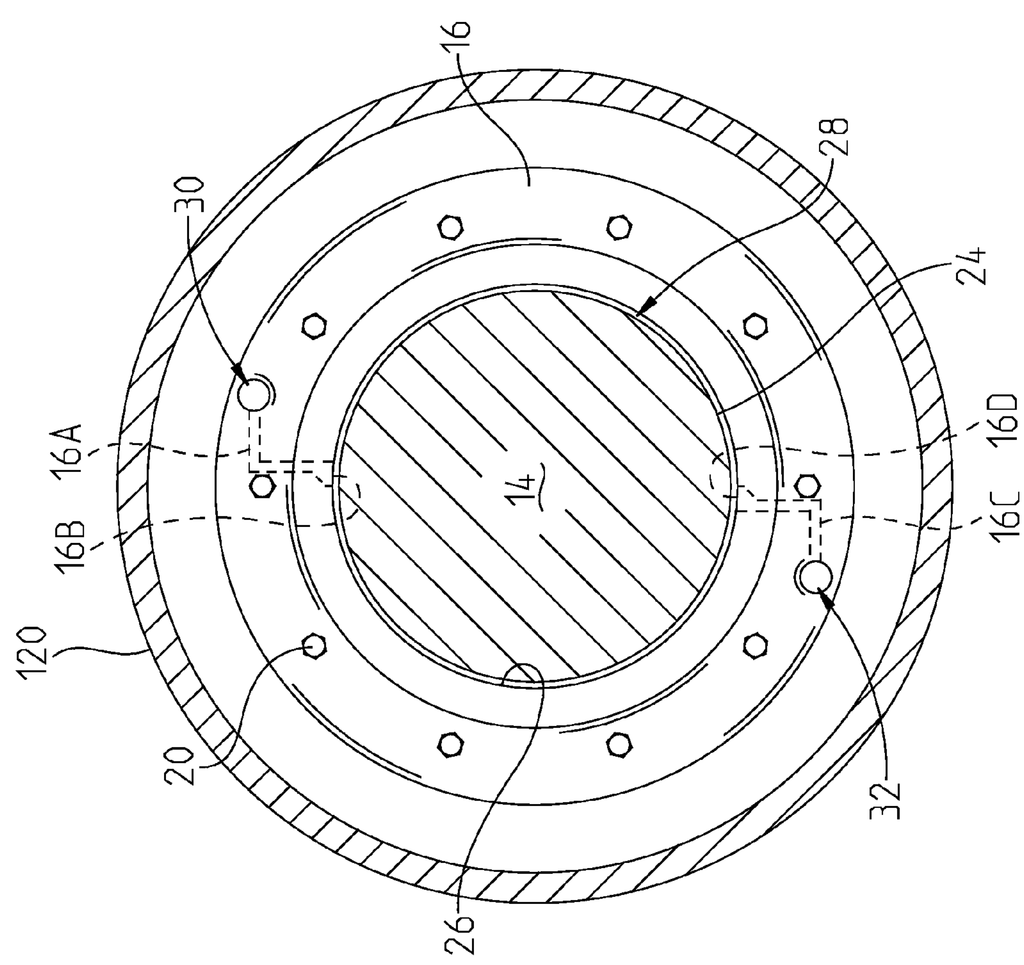
FIG. 3 is an axial cross sectional view taken along line 3-3 in FIG. 2.

FIG. 3 shows a fluid inlet 30 and a fluid outlet 32 that are associated with the ring assembly 15. A first passage 16A is defined within the air side ring 16 and extends between and communicates with the fluid inlet 30 and a first opening 16B at the air side ring inner side 24. A second passage 16C is defined within the air side ring 16 and extends between and communicates with the fluid outlet 32 and a second opening 16D at the air side ring inner side 24. The first and second passages 16A, 16C extend between the ring seals 25A, 25B so as to extend to the first and second openings 16B, 16D.

The fluid inlet 30 is in communication with a seal oil pump 34 (see FIG. 1) associated with an oil reservoir 35 for delivering cooled and substantially clean oil to the ring assembly 15. The oil passes through the first passage 16A to the first opening 16B in the air side ring inner side 24 such that oil flows between the ring seals 25A, 25B and the rotatable shaft 14. A portion of the oil flowing between the ring seals 25A, 25B and the rotatable shaft 14 enters the second opening 16D at the air side ring inner surface 24, passes through the second passage 16C and exits the seal structure 22 via the fluid outlet 32. The fluid outlet 32 is also in communication with the seal oil pump 34, although additional structure (not shown), such as, for example an oil filter and/or a heat exchanging element, may be disposed between the fluid outlet 32 and the seal oil pump 34. Additionally, an oil catcher 36 having an associated drain 36A (see FIG. 2), and a bearing oil drain 38 (See FIGS. 1 and 2) may be associated with the ring assembly 15 for collecting excess oil from the ring assembly 15 and/or other structure utilizing oil within the generator 10, such as the bearings 13A, 13B, for example. Oil captured by the oil catcher 36 and the bearing oil drain 38 may return via conventional conduit structure to the seal oil pump 34 and/or the additional structure as is commonly known in hydrogen-cooled generators. It is understood that the seal oil pump 34 and the oil reservoir 35 may be located remotely from the generator 10 as shown in FIG. 1, wherein conduit structure is used to define paths for the oil to move between the seal oil pump 34 and the oil reservoir 35, the fluid inlet 30, the fluid outlet 32, the oil catcher 36, and the oil drain 38.

Figure 4:
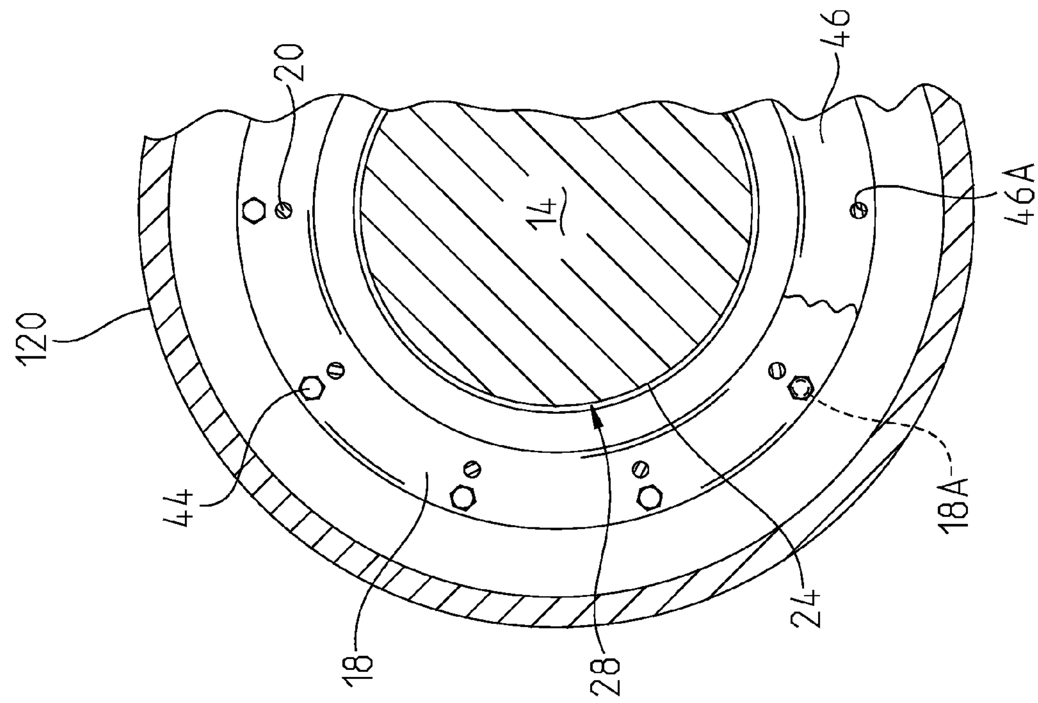
FIG. 4 is a partial axial cross sectional view taken along line 3-3 in FIG. 2, wherein an air side ring and a portion of a hydrogen side ring have been removed.

The hydrogen side ring 18 is coupled to the first end shield 120 of the generator frame 11 as shown in FIGS. 2 and 4. A plurality of second fasteners 44, such as, for example, insulating bolts, is used to couple the hydrogen side ring 18 to the first end shield 120. The second fasteners 44 are formed from an insulating material, such as, for example, green glass epoxy, although any suitable insulating material may be used. Optionally, washers (not shown) formed from an insulating material, such as, for example, green glass epoxy, may be disposed between heads of the bolts 44 and the hydrogen side ring 18.

As illustrated in FIG. 4, an insulating structure 46 is circumferentially aligned with the hydrogen side ring 18 and is disposed between the hydrogen side ring 18 and the first end shield 120. The insulating structure 46 shown in FIG. 4 is an insulating paper gasket, although other types of insulating structures formed from other types of materials, such as, for example, rubber or silicon can be used as desired. In the embodiment shown, outer and inner diameters of the insulating structure 46 substantially coincide with outer and inner diameters of the hydrogen side ring 18, although it is understood that the outer and inner diameters of the insulating structure 46 may slightly overlap the outer and inner diameters of the hydrogen side ring 18. Further, apertures 46A formed in the insulating structure 46 correspond to apertures 18A formed in the hydrogen side ring 18 for receiving the second fasteners 44. Optionally, a third seal structure 48, such as an O-ring, for example, may be disposed between the insulating structure 46 and the first end shield 120, as shown in FIG. 2. The insulating structure 46 prevents direct contact between the hydrogen side ring 18 and the first end shield 120 such that an electrical path between the first end shield 120 and the hydrogen side ring 18 is prevented. It is noted that a plurality of third fasteners (not shown), such as, for example, stainless steel bolts, is used to couple the first end shield 120 to the generator frame main body 110, and a plurality of fourth fasteners 50 (See FIG. 2) is used to couple the oil catcher 36 to the first end shield 120.

During operation of the generator 10, components disposed within the generator frame internal chamber 11A are cooled with the hydrogen gas, as is known in the art. As discussed above, the first and second shaft seal assemblies 12A, 12B prevent air from entering into the generator frame internal chamber 11A and prevent hydrogen gas from escaping from the generator frame internal chamber 11A. To form the substantially fluid tight seal between the first and second shaft seal assemblies 12A, 12B and the rotatable shaft 14, the radial coil springs 31A, 31B provide a radially inward bias to the ring seals 25A, 25B to maintain the ring seals 25A, 25B in close proximity to the rotatable shaft 14. Cool and substantially clean oil is delivered to each corresponding seal structure 22 from the oil reservoir 35 via the seal oil pump 34, which pumps the oil to each seal structure 22 through the corresponding fluid inlet 30 and first passage 16A. The oil then forms the thin layer of oil 28 that flows axially between the rotatable shaft 14 and the ring seals 25A, 25B, as disclosed in U.S. patent application Ser. No. 11/136,639. A portion of the oil flows out of each seal structure 22 through the corresponding second passage 16C and fluid outlet 32 and is conveyed back toward the seal oil pump 34 where the oil can be filtered and cooled by the additional structure. Other portions of the oil are collected in the oil catchers 36 and the bearing oil drains 38 associated with the first and second shaft seal assemblies 12A, 12B and drained back toward the seal oil pump 34 where the oil can be filtered and cooled by the additional structure.

After periods of use, either or both of the first and second shaft seal assemblies 12A, 12B may be serviced, such as for inspection, repair, and/or replacement. To perform the service on the first and second shaft seal assemblies 12A, 12B, it is often necessary to remove the air side ring 16 from the hydrogen side ring 18. For example, the seal structure 22 may be serviced, as contact between the seal structure 22 and the rotatable shaft 14, which may occur during operation of the generator 10, can cause wear of the seal structure 22. When this procedure is performed, the hydrogen side ring 18 need not be removed from the first end shield 120 to gain access to and service the seal structure 22.

Since the hydrogen side ring 18 is not removed from the first end shield 120, the insulation structure 46 is unexposed and left intact. This feature is an advantage, as exposure of the insulation structure 46 is undesirable. Specifically, exposure of the insulation structure 46 can disrupt the electrical insulation function performed by the insulating structure 46 i.e., proving electrical insulation between the first end shield 120 and the hydrogen side ring 18. For example, if the insulation structure 46 is exposed and disturbed, debris may contact the insulation structure 46 or the insulation structure 46 may be damaged, which may prevent the insulation structure 46 from providing adequate electrical insulation between the first end shield 120 and the hydrogen side ring 18. If the electrical insulation is prevented from providing adequate electrical insulation such that the first end shield 120 and the hydrogen side ring 18 are no longer electrically insulated from one another, an electrical path may be created from the rotatable shaft 14 through the shaft seal assembly 12A to the first end shield 120, which may cause arcing damage to the seal structure 22 including the radial springs 31A, 31B and/or the axial springs 33A, 33B. Further, the electric current flowing through the shaft seal assembly 12A could cause the radial springs 31A, 31B and/or the axial springs 33A, 33B to bond to the associated housing (not shown) or the air side ring 16. It is also possible that the electric current may flow inconsistently from the rotatable shaft 14 through the seal structure 22, which could cause pitting on the rotatable shaft 14, thus giving the rotatable shaft 14 a rough outer surface. The rough outer surface of the rotatable shaft 14 could grind the outer surface of the seal structure 22 and reduce the sealing function of the shaft seal assembly 12A.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal assembly forming a seal with a rotatable shaft of a hydrogen-cooled generator, the seal assembly comprising:

a ring assembly disposed about the rotatable shaft and including a fluid inlet and a fluid outlet, said ring assembly comprising:

a hydrogen side ring directly coupled to a generator frame of the generator;

an insulating structure positioned between said hydrogen side ring and said generator frame to provide electrical insulation between said hydrogen side ring and said generator frame;

an air side ring disposed adjacent to said hydrogen side ring;

seal structure coupled to said air side ring; and structure for supplying oil to said ring assembly such that the oil flows through said ring assembly to an interface between the rotatable shaft and said seal structure so as to substantially limit direct contact between the rotatable shaft and said seal structure.

2. A seal assembly as laid out in claim 1, wherein said air side ring is mechanically coupled to said hydrogen side ring.

3. A seal assembly as laid out in claim 1, wherein said fluid inlet is formed in said air side ring and in communication with a seal oil pump that conveys substantially clean oil to said fluid inlet.

4. A seal assembly as laid out in claim 1, wherein said generator frame comprises an end shield and at least one insulated fastening structure is used to mount said hydrogen side ring to said end shield.

5. A seal assembly as laid out in claim 1, wherein said hydrogen side ring and said air side ring are formed from segments of carbon steel.

6. A seal assembly as laid out in claim 1, wherein said seal structure comprises carbon seal segments that are arranged on said air side ring to extend about the rotatable shaft.

7. A seal assembly as laid out in claim 1, wherein said insulating structure comprises a gasket formed from one of paper, rubber, and silicon.

8. A seal assembly forming a seal with a rotatable shaft of a hydrogen-cooled generator, the seal assembly comprising:

a ring assembly disposed about the rotatable shaft and including a fluid inlet and a fluid outlet, said ring assembly comprising:

a first side ring directly coupled to a generator frame of the generator;

an insulating structure positioned between said first side ring and said generator frame to provide electrical insulation between said first side ring and said generator frame;

a second side ring coupled to said first side ring, wherein said second side ring is not in direct contact with said generator frame;

seal structure coupled to one of said first and second side ring; and structure for supplying oil to said ring assembly, such that the oil flows through said ring assembly to an interface between the rotatable shaft and said seal structure so as to substantially limit direct contact between the rotatable shaft and said seal structure.

9. A seal assembly as laid out in claim 8, wherein said fluid inlet is in communication with a seal oil pump that conveys substantially clean oil to said fluid inlet.

10. A seal assembly as laid out in claim 8, wherein said generator frame comprises an end shield and at least one insulated fastening structure is used to mount said first side ring to said end shield.

11. A seal assembly as laid out in claim 8, wherein said first side ring and said second side ring are formed from segments of carbon steel.

12. A seal assembly as laid out in claim 8, wherein said seal structure comprises carbon seal segments that extend about the rotatable shaft.

13. A seal assembly as laid out in claim 8, wherein said insulating structure comprises a gasket formed from one of paper, rubber, and silicon.

* * * * *